Sept. 19, 1950     T. R. HARRISON     2,523,017
DETONATION DETECTOR SYSTEM
Filed April 11, 1946     4 Sheets-Sheet 1
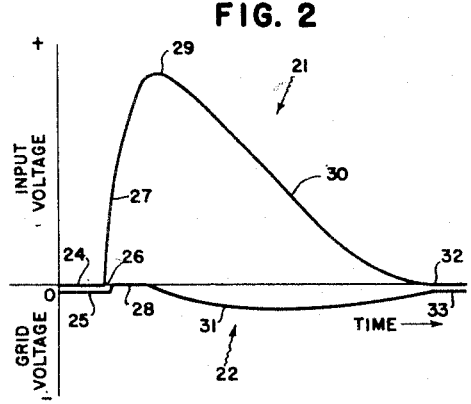
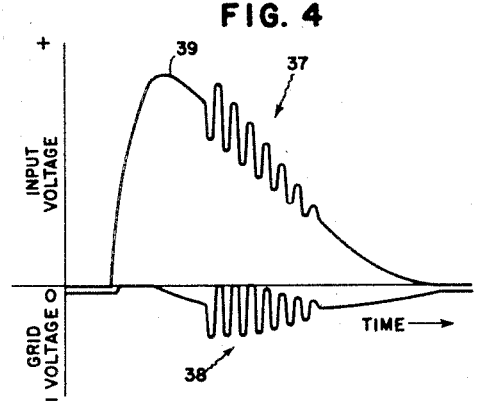
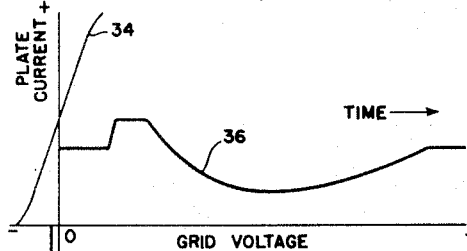
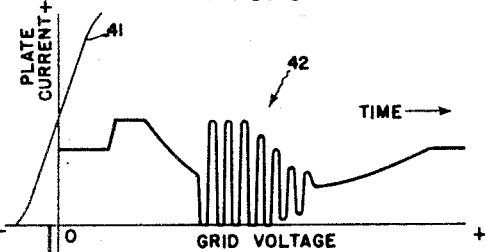
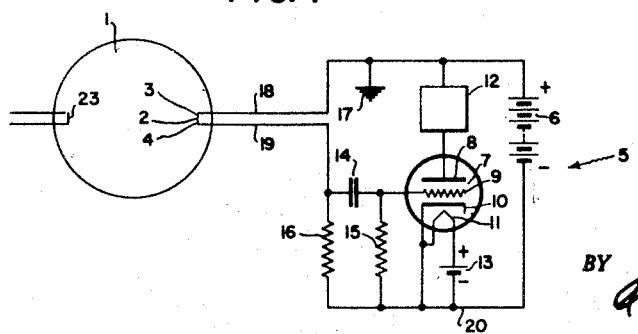
*INVENTOR.*
THOMAS R. HARRISON
BY
Arthur H. Swanson
ATTORNEY.

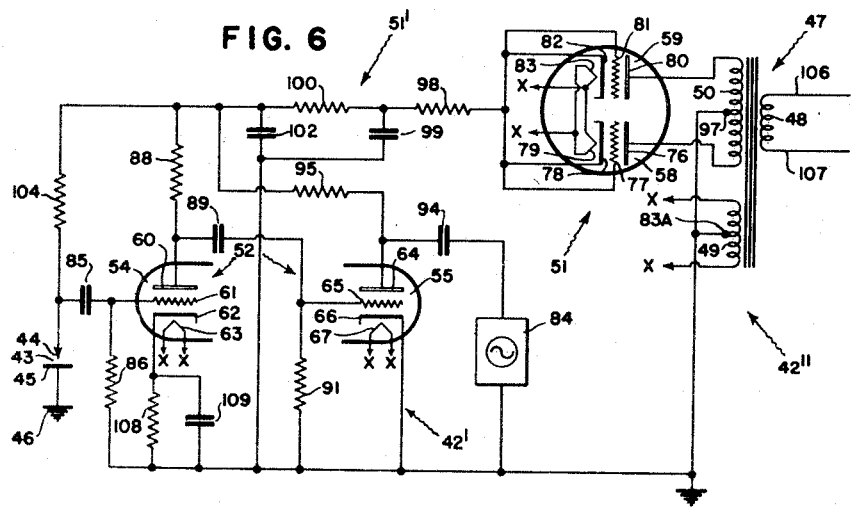

Sept. 19, 1950     T. R. HARRISON     2,523,017
DETONATION DETECTOR SYSTEM
Filed April 11, 1946     4 Sheets-Sheet 3
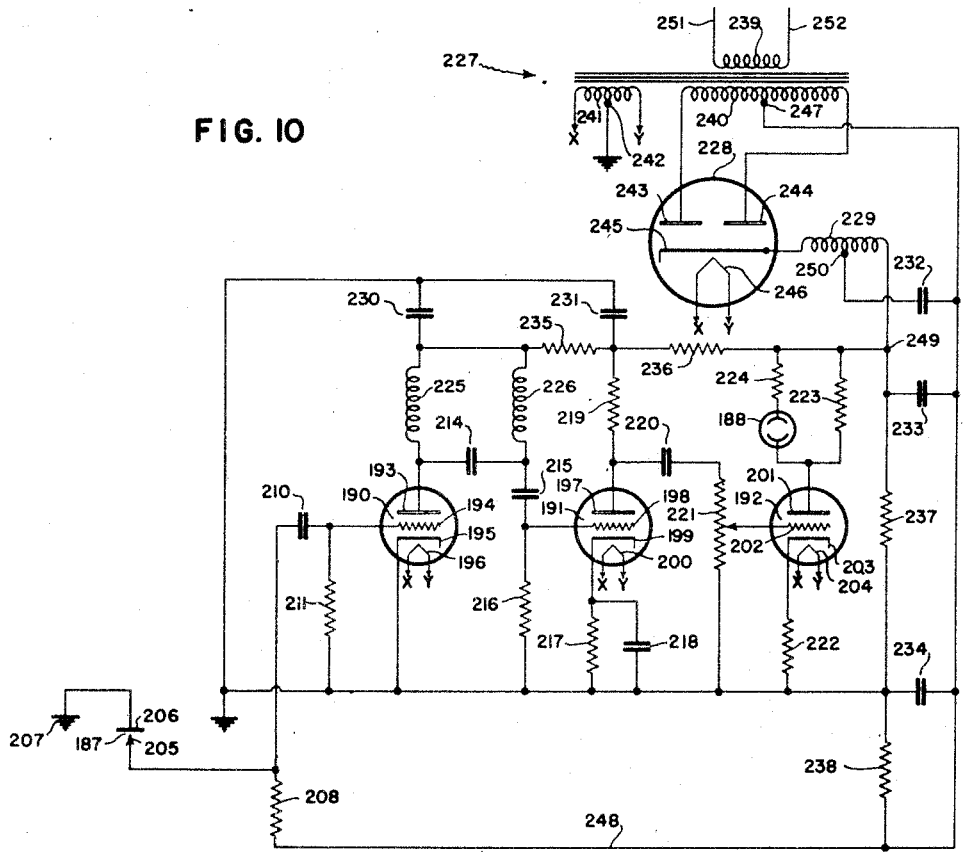
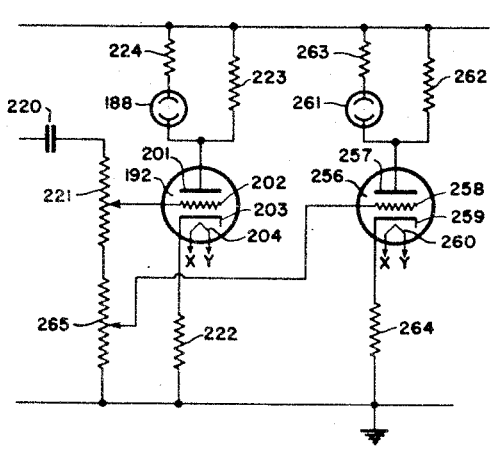
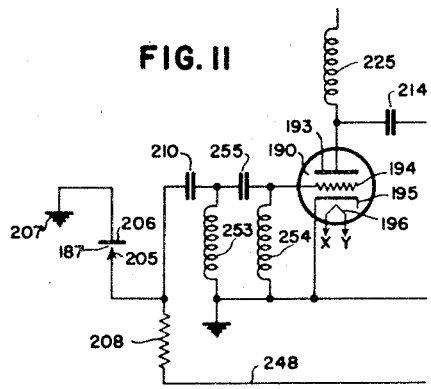
*INVENTOR.*
THOMAS R. HARRISON
BY *Arthur H. Swanson*
ATTORNEY.

Sept. 19, 1950          T. R. HARRISON          2,523,017
DETONATION DETECTOR SYSTEM
Filed April 11, 1946          4 Sheets-Sheet 4
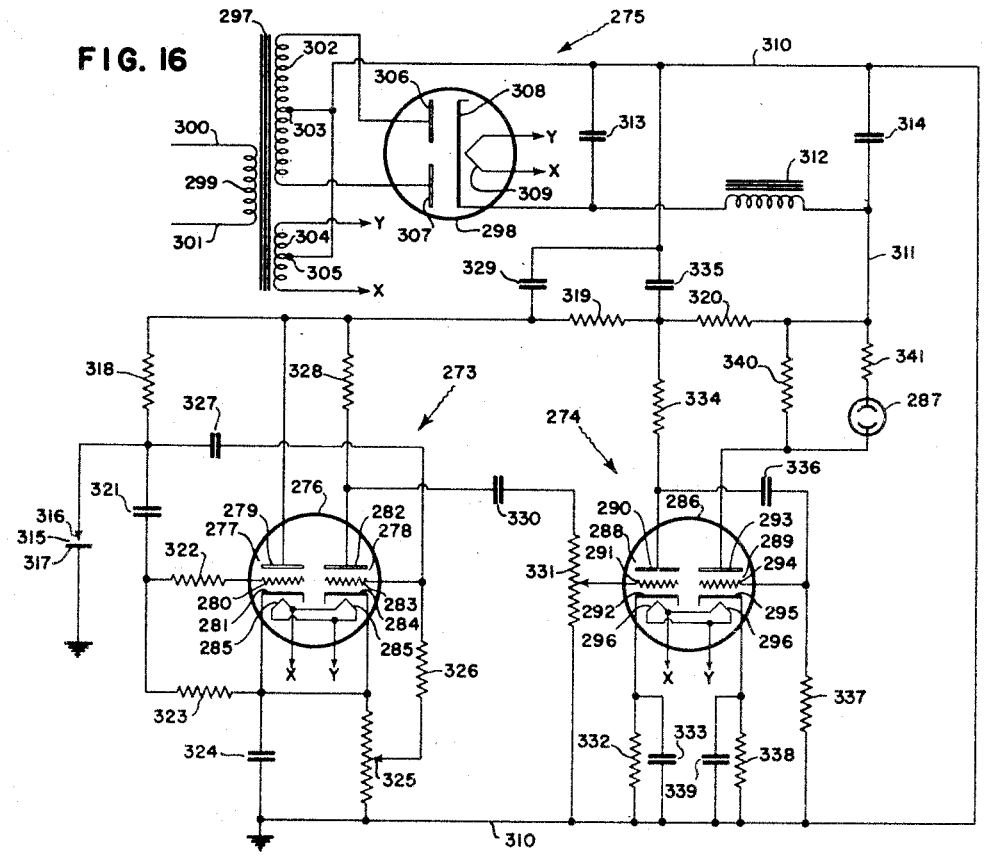
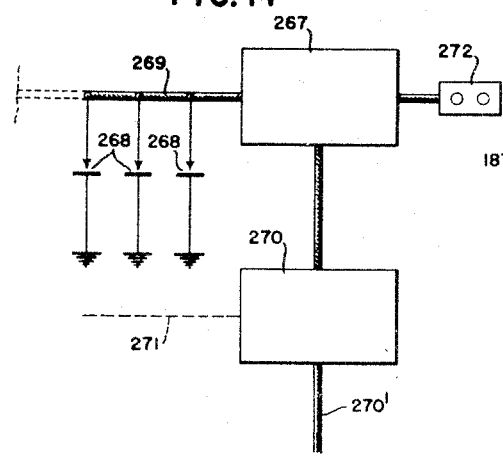
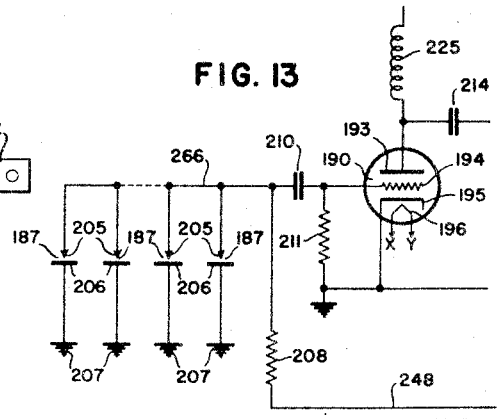
INVENTOR.
THOMAS R. HARRISON
BY Arthur H. Swanson
ATTORNEY.

Patented Sept. 19, 1950

2,523,017

UNITED STATES PATENT OFFICE 2,523,017

DETONATION DETECTOR SYSTEM

Thomas R. Harrison, Wyncote, Pa., assignor, by mesne assignments, to Minneapolis-Honeywell Regulator Company, Minneapolis, Minn., a corporation of Delaware Application April 11, 1946, Serial No. 661,203

18 Claims. (Cl. 177—311)

The present invention relates to a method of and apparatus for detecting fluctuations in ionization in a chamber containing ionized particles, and has especial utility in detecting and indicating the fluctuations in ionization accompanying detonation in an internal combustion engine and for effecting any suitable control in response to such ionization fluctuations.

An object of the present invention is to provide an improved method of and apparatus for detecting and indicating fluctuations in ionization occurring in a chamber containing ionized particles.

Another object of the invention is to provide an improved method of and apparatus for detecting and indicating the fluctuations in ionization accompanying detonation in an internal combustion engine thereby to provide an indication of detonation and also of the degree of the latter.

Another object of the invention is to provide a detonation indicating device suitable for use on aircraft engines, whereby the fuel consumption rate of such engines may be decreased and the flying range of the craft thereby increased.

Still another object of the invention is to provide a detonation detecting device suitable for indicating the occurrence of detonation in any one or in all of the cylinders of a multi-cylinder spark ignited engine, such as an aircraft engine, whereby the performance of the entire engine is made known to the operator.

It is also an object of the present invention to provide means for automatically controlling the fuel to air ratio of the combustible mixture supplied to a spark ignited engine in such a manner that the mixture is kept as lean as possible without detonation occurring.

Detonation occurs in the combustion chamber of a spark ignited engine when the fuel to air ratio of the combustible mixture supplied to the engine falls below a certain value. This value depends on several factors, such as load, temperature, type of fuel, etc. For a given set of conditions, however, it is desirable from an economic standpoint to operate an engine at as low a fuel to air ratio, or with as lean a fuel mixture, as possible without causing detonation to occur. Detonation in a spark ignited engine is highly undesirable since it frequently results in damage to the engine.

For stationary spark ignited engines, the "ping" or "knock" which accompanies detonation can often be detected aurally, and the fuel to air ratio can be adjusted until the leanest mixture possible of attainment is obtained without detonation occurring. Maximum power for a minimum of fuel consumption is thereby obtained.

In the case of others types of engines, for example aircraft engines, the sounds which accompany detonation cannot be distinguished from other existing noises, and unless another means of detecting detonation is employed, the fuel to air ratio must be set at a sufficiently high value to preclude all possibility of detonation and its damaging effects occurring. The use of this excessively rich fuel mixture leads to excessive fuel consumption which is particularly disadvantageous in aircraft operation, since for a given fuel carrying capacity the flying range of the craft depends primarily on the amount of fuel consumed per unit of distance flown.

In the prior art, there have been proposed several types of detonation detectors, using bouncing pins and contacts, cylinder pressure indicators, or vibration pick-ups. These types of detectors are often seriously affected in their operation by extraneous vibrations, such as the closing of the engine valves, and the pressure indicator type is further affected by the corrosive action of the cylinder gases with which the pressure detecting unit is in contact.

It has been shown that the ionization of the gases within the cylinder of a spark ignited engine exhibits a qualitative change of pattern, when the engine is detonating, from the pattern which exists when the engine is operating normally and without detonation.

In an internal combustion engine, when the cylinder gases are ignited, they burn, and the accompanying ionization causes them to become electrically conductive. In a non-detonating cylinder, this ionization rises to a maximum at a comparatively rapid rate and then gradually diminishes during the power stroke of the engine. The ionization pattern thus produced comprises a series of relatively large fluctuations or surges of ionization, one surge for each firing of the cylinder, whose rate of occurrence is dependent upon the speed of operation of the engine.

When detonation takes place, it does so at a time shortly after the ionization has reached its maximum value, occurring, therefore, while the ionization is decreasing. The occurrence of detonation is accompanied by the occurrence of a train of relatively low valued, high frequency, damped oscillations or fluctuations of ionization superimposed on the descending portion of the ionization fluctuation or surge caused by combustion. The ionization pattern thus produced comprises the same series of relatively large ionization fluctuations or surges caused by combustion, but in addition on the descending portions of these fluctuations there will be superimposed the relatively low valued, high frequency trains of damped oscillations indicative of detonation. Thus, upon the occurrence of detonation, a qualitative change takes place in the ionization pattern.

In the present invention, the changes in conductivity of the cylinder gases which result from changes in ionization of the latter cause corresponding changes in an electrical current which is caused to flow between a pair of electrodes located in the cylinder. This varying current is fed into a discriminating and amplifying circuit wherein the effects of the surges of current caused by the above mentioned ionization surges are suppressed. However, the relatively high frequency damped oscillations or fluctuations of the current, caused by the fluctuations of ionization accompanying detonation, are not suppressed, but are separated from the signal resulting from the suppressed surges of combustion and are amplified and caused to actuate an indicator, thereby providing an indication of the occurrence of detonation.

When a detonation detector of the type described above is operatively connected to an internal combustion engine, the engine operator can decrease the fuel to air ratio of the combustible mixture supplied to the engine until the detonation indicator signals that a further reduction in this ratio will cause an undesirable intensity of detonation to occur. This permits the engine to be operated with a minimum fuel consumption rate, without the danger of serious detonation occurring. Moreover, a control means can be incorporated with the detonation indicating device whereby the fuel to air ratio will automatically be set to and maintained at the optimum value of minimum rate of fuel consumption for a desired slight intensity of detonation.

Since the present invention requires the installation in one or more of the engine cylinders of only a substantially rugged, simple ionization-gap plug, it is suitable for use with aircraft engines where simplicity of installation, minimum maintenance, and dependable operation are prime requisites. Further, the present invention is insensitive to extraneous vibrations, and is therefore not affected in its operation by such disturbances.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which are illustrated and described preferred embodiments of the invention.

Of the drawings:

Fig. 1 is a schematic circuit diagram of apparatus embodying the principle of the present invention;

Fig. 2 is a typical curve showing the wave form of the voltage supplied to the input of the circuit of Fig. 1 when the engine fires normally and produces a regular ionization pattern, and also showing the potential of the grid of the vacuum tube of Fig. 1 with respect to its cathode for the normal firing ionization pattern;

Fig. 3 is a typical grid voltage-plate current characteristic curve for the vacuum tube of Fig. 1, the values of grid voltage and plate current shown being for the non-detonating condition of Fig. 2;

Fig. 4 is a curve, corresponding to that of Fig. 2, which is obtained when the engine is detonating and producing a qualitative change in the ionization pattern;

Fig. 5 is a grid voltage-plate current characteristic curve corresponding to that of Fig. 3 which is obtained for the detonating condition of Fig. 4;

Fig. 6 is a modification of the detector of Fig. 1, adapted for alternating current operation and provided with an additional stage of amplification;

Fig. 7 is an embodiment of the detector circuit of Fig. 1, wherein an R.-C. filter network is provided to further suppress the steep wave front of the ionization curve, and a neon lamp is used to indicate the occurrence of detonation;

Fig. 8 is a modification of the detector circuit of Fig. 7, using an L.-C. filter;

Fig. 9 is another modification of Fig. 7 wherein a different R.-C. filter network is employed;

Fig. 10 is a modification of the detector circuit of Fig. 7 which provides for alternating current operation and includes a preferred method of supplying voltage to the ionization gap;

Fig. 11 is a modification of the detector circuit of Fig. 10 wherein an input filter network is added;

Fig. 12 is another modification of Fig. 10 which employs two indicating lamps for showing two progressive intensities of detonation;

Fig. 13 illustrates another embodiment of the invention wherein a plurality of ionization gaps are connected to a single detector circuit, shown by way of example as the detonation detector circuit of Fig. 10;

Fig. 14 illustrates more or less diagrammatically an arrangement in which a detonation detector embodying the principles of the present invention automatically controls the fuel to air ratio of the combustible mixture supplied to an engine;

Fig. 15 illustrates in detail a portion of the arrangement of Fig. 14; and

Fig. 16 illustrates another embodiment of the present invention employing a time delay circuit as a discriminator.

With reference to Fig. 1, the cylinder of a spark ignited internal combustion engine is generally designated at 1. Located within the cylinder is an ionization gap 2 which has its electrodes 3 and 4 connected into the circuit of a detonation detector, generally designated at 5. This circuit comprises a source of D. C. potential, such as a battery shown at 6; a vacuum tube 7 having a plate 8, a grid 9, a cathode 10, and a heater filament 11; suitable means generally designated at 12 and responsive to the fluctuations characteristic of detonation; a source of direct current, such as a battery 13, for energizing the heater filament 11 of the tube 7; a condenser 14; and resistances 15 and 16. The detector circuit 5 is connected to ground at the point 17.

The electrode 3 of the ionization gap 2 is connected by means of a lead 18 to the ground connection 17, to one side of the indicator 12, and to the positive terminal of the battery 6. The other electrode 4 of the gap 2 is connected by means of a lead 19 to one side of the condenser 14 and to the adjacent end of the resistor 16.

The other side of the condenser 14 is connected to the grid 9 of the vacuum tube 7, and to one end of the resistance 15. The other ends of the resistances 15 and 16 are connected to a negative bus 20, which, in turn, is connected to the negative terminal of the battery 6. The cathode 10 of the tube 7 is connected to the bus 20, as are one side of the heater filament 11 and the negative terminal of the battery 13. The other side of the heater filament 11 is connected to the positive terminal of the battery 13. The plate 8 of tube 7 is connected to the remaining side of the indicator 12.

When the detector 5 is in operation, the battery 6 causes a difference of potential to exist across the gap 2. When there are no burning gases in the cylinder 1, the resistance across gap 2 is infinitely high, and little or no current flows in the gap circuit. There is, therefore, no voltage drop across the resistance 16. Some electrons from cathode 10 are picked up by the grid 9, causing a slight current to flow in the grid-cathode circuit through the resistance 15. This current flow causes a voltage to be developed across the resistance 15, which voltage supplies a fixed amount of negative bias for the tube 7 and, therefore, maintains the grid 9 slightly negative with respect to the cathode 10.

The curves of Fig. 2 show typical values for input and grid voltages as functions of time for normal, non-detonating operation of the engine. Curve 21 shows the voltage developed across the resistance 16 vs. time, and curve 22 shows the voltage between the grid and the cathode of the tube 7 vs. time.

In the cylinder 1, the spark produced by a spark plug 23 ignites the combustible mixture supplied to and compressed within the cylinder. The flame front of the burning gases moves across the cylinder from the vicinity of the spark plug 23 to the gap 2, and the ionization of the gases, caused by their burning, produces changes in the resistance existing between the electrodes 3 and 4 of the gap 2. These changes in gap resistance due to the ionization of the gases cause a surge of current to flow in the gap circuit and through the resistance 16. This current surge causes a potential surge to be developed across the resistance 16, and for non-detonating operation, this potential is shown as a function of time in the curve 21 of Fig. 2.

When there are no burning gases present in the cylinder 1, the voltage across the resistance 16 is substantially zero, as shown by the portion 24 of the curve 21. Under this condition there is a constant grid bias voltage on the tube 7 as shown by the portion 25 of the grid voltage curve 22. When ionization of the gases in the vicinity of the gap 2 begins, as at the point 26, the voltage across the resistance 16 starts to rise, as shown by the steeply rising portion 27 of the curve 21. This voltage tends to drive the grid 9 positive with respect to its cathode 10, as shown by the portion 28 of the curve 22. When this tendency occurs, an increased number of electrons is attracted by the grid, and these electrons then flow in the grid-cathode circuit of the tube 7, and through the resistance 15. The resulting current is of such magnitude and direction as to produce across the resistance 15 a voltage drop which opposes the voltage tending to swing the grid positive, and so maintains the grid at practically zero potential with respect to the cathode. This grid rectifying action of the tube 7, therefore, keeps the grid 9 from following the steep positive rise in the potential across the resistance 16. The value of the condenser 14 is made sufficiently small so that the potential across the resistance 15 can rise without causing a corresponding rise in the grid-cathode potential.

As the voltage across the resistance 16 builds up, a charge is also established on condenser 14. When the degree of ionization reaches a maximum, and hence the voltage across the resistance 16 is maximum, as at the point 29 on the curve 21, the condenser 14 is fully charged.

From the point 29, the voltage across the resistance 16 decreases along the portion 30 of the curve 21, due to decreasing ionization. The potential on the grid 9 tends to follow this decrease, but is limited to a comparatively small drop, as shown by the portion 31 of the curve 22, due to the flow of electrons from the condenser 14 through the resistance 15. The values of the condenser 14 and the resistance 15 are so chosen that the average grid bias as represented by the portion 31 of the curve 22 is approximately one-half of the bias necessary to cause cut-off of the tube 7.

At the point 32 of the curve 21, the voltage across the resistance 16 has dropped to its initial zero value. It is seen from the curve 22 that the grid potential returns to its initial bias value at a point 33 soon after the voltage across resistance 16 reaches zero value at point 32. The slight lag between the times that the voltage across the resistance 16 and the grid voltage reach their initial values is due to the electrical inertia of the circuit of the discharging condenser 14.

From the above it can be seen that the grid 9 is prevented from following to more than a limited extent the increase or the decrease of the voltage across the resistance 16. Hence suppression of this voltage surge, caused by combustion, as applied to the grid 9, is obtained.

In Fig. 3 is shown the manner in which the plate current of the tube varies with respect to time as a result of the changes in grid voltage occurring as shown by the curve 22 of Fig. 2. The curve 34 of Fig. 3 is the grid voltage-plate current characteristic curve for the tube 7 and shows the relation of the tube's plate current to the potential between the grid and cathode. The curve 35 of Fig. 3 is the grid voltage curve 22 of Fig. 2, laid out along the plate current axis of the characteristic 34. From the curves 34 and 35, the curve 36 of plate current vs. time is obtained in the usual manner known to those skilled in the art.

From the plate current curve 36, it can be seen that the plate current follows the swings in grid voltage of the curve 35. The swings in plate current are greater than the corresponding swings in grid voltage, however, due to the amplifying action of the tube 7. These swings in plate current, caused by combustion and shown by the curve 36, do not cause the indicator 12 in the plate circuit of the tube 7 to give an indication of the occurrence of detonation, since the indicator 12 is responsive only to plate current fluctuations caused by detonation and having relatively greater magnitude and higher frequency than those of combustion shown by the curve 36. The indicator 12 may take any one of a number of different forms, and for example, may comprise a pair of head-phones or a cathode ray oscilloscope.

When detonation, or a secondary explosion due to a rapid increase in pressure and heating of the gases, takes place, a change occurs in the ionization pattern produced across the gap 2 as explained hereinbefore. The voltage variations then produced across the resistance 16 are different from those shown in the curve 21 of Fig. 2, and have been represented for purposes of illustration by the curve 37 of Fig. 4. In this figure is also shown a curve 38 of the variations in grid voltage which occur as a result of such variations in voltage across the resistance 16. Thus it is seen that the curves of Fig. 4 correspond to the respective curves of Fig. 2, except that the former are typical for detonating operation of the engine, while the latter are for normal, non-detonating operation.

The curve 37 of Fig. 4 is seen to rise to the point 39 in approximately the same manner as the curve 21 of Fig. 2. Therefore, the grid voltage as shown by the curve 38 of Fig. 4 varies in approximately the same manner as that shown by the curve 22 of Fig. 2. As the voltage of curve 37 decreases from the point 39, it is seen to follow a fluctuating pattern as shown, rising and falling about a mean value similar to the portion 30 of the curve 21. These damped fluctuations or oscillations of the voltage across the resistance 16 are caused by the changes in the ionization of the gap 2 resulting from detonation of the gases in the cylinder. As shown by the curve 38, the grid voltage follows the oscillations of the voltage of curve 37, except that due to grid rectification in the tube 7, the grid voltage is not permitted to become more than slightly positive with respect to the voltage of cathode 10.

The grid voltage curve 38 of Fig. 4 is shown in Fig. 5 as curve 40, laid out along the plate current axis of a grid voltage-plate current characteristic curve 41. This characteristic is the same as that shown by the curve 34 of Fig. 3. The grid voltage oscillations, resulting from detonation, produce corresponding plate current oscillations, as shown by the curve 42 of plate current vs. time. The magnitude of the plate current oscillations is greater than that of the corresponding grid voltage variations due to the amplifying action of the tube 7. These plate current oscillations cause the indicator 12 to give an indication of the occurrence of detonation, since they are quite different in their amplitude and frequency of occurrence from the plate current fluctuations which accompany combustion. The indicator 12 is responsive to oscillations of the nature of those accompanying detonation, hence upon the occurrence of the latter, the indicating device 12 will give an indication. In the case, for example, where the indicator 12 is a cathode ray oscilloscope, the appearance on the screen of the high frequency oscillation pattern is the indication of the occurrence of detonation.

In Fig. 6 is illustrated a modification of the detonation detector circuit of Fig. 1 wherein the batteries of Fig. 1 are eliminated, an energizing circuit supplies energizing voltage to the apparatus, and an additional stage of amplification is provided for improving the operating characteristics of the apparatus.

The detonation detector circuit of Fig. 6 comprises a discriminating and amplifying portion generally designated at 42', an indicator, such as a cathode ray oscilloscope generally designated at 84, and an energizing circuit generally designated at 42''.

Connected to the discriminating and amplifying circuit 42' is an ionization gap 43, formed between a central insulated electrode 44 and the cylinder wall 45 through which the electrode passes, the wall of the cylinder being grounded through the engine frame as shown at 46.

The energizing circuit 42'' comprises a power transformer generally designated at 47, having a primary winding 48, a vacuum tube heater winding 49, and a high voltage secondary winding 50. The circuit 42'' also includes a vacuum tube rectifier 51, a filter circuit portion 51', and various other circuit components to be hereinafter described.

The discriminating and amplifying circuit 42' comprises a vacuum tube 52 and various other circuit components to be hereinafter described. The vacuum tube 52 may be of the twin triode type, such as the type 7N7, comprising two sets of triode elements 54 and 55, respectively, contained in a single envelope. The triode 54 comprises a plate 60, a control grid 61, a cathode 62, and a heater filament 63. The triode 55 comprises a plate 64, a control grid 65, a cathode 66, and a heater filament 67. The vacuum tube 51 may also be of the twin triode type comprising two sets of triode elements 58 and 59, respectively. The triode 58 comprises a plate 76, a control grid 77, a cathode 78, and a heater filament 79. The triode 59 comprises a plate 80, a control grid 81, a cathode 82, and a heater filament 83.

The electrode 44 of the ionization gap 43 is connected through a coupling condenser 85 to the grid 61 of the triode 54. A grid resistance 86 is connected between the grid 61 and ground. The plate 60 of the triode 54 is connected to the filter circuit 51', to be hereinafter described, through a plate load resistance 88. The triode 54 is supplied with cathode bias by a cathode bias resistance 108 connected between the cathode 62 and ground. A cathode bypass condenser 109 is connected in parallel with the resistance 108 in the usual manner to reduce degeneration.

The plate 60 of the triode 54 is coupled to the grid 65 of the triode 55 by a coupling condenser 89. A grid resistance 91 is connected between the grid 65 and ground. The plate 64 is connected to the filter circuit 51' through a plate load resistance 95. The cathode 66 of the triode 55 is connected directly to ground. One side of the input to the cathode ray oscilloscope is connected to the plate 64 through a blocking condenser 94, the other side of the oscilloscope input being connected to ground.

In the energizing circuit 42'', the plates 76 and 80 of the tube 51 are connected, respectively, to the opposite ends of the secondary winding 50 of the transformer 47. The grids 77 and 81 and the cathodes 78 and 82 are all connected together to one end of a filter resistance 98. The opposite end of the resistance 98 is connected to one end of a second filter resistance 100 and to one side of a filter condenser 99, the other side of which is connected to ground. The opposite end of the resistance 100 forms the positive output terminal for the filter circuit portion 51' of the energizing circuit 42'' just described. To this end of the resistance 100 are connected the plate load resistances 88 and 95 previously described and one side of a second filter condenser 102 whose other side is connected to ground. The electrode 44 of the gap 43 is also connected to the output end of the resistance 100 through a resistance 104. A center-tap 97 on the secondary winding 50 of the transformer 47 forms the negative output terminal for the energizing circuit 42'' and is connected to ground. The heater filaments 63, 67, 79, and 83 are supplied with energizing voltage by the secondary winding 49 of the transformer 47, being connected to this winding by the conductors X, partially shown. A center-tap 83A on the winding 49 is connected to ground to balance out the stray alternating voltages of the heater circuit. The primary winding 48 of the transformer 47 is supplied with energizing voltage from an alternating current source of potential, not shown, by the conductors 106 and 107.

In the above described energizing circuit 42", the vacuum tube 51 functions as a full wave rectifier, delivering to the filter circuit a unidirectional pulsating voltage. The filter circuit 51' functions in the usual manner known to those skilled in the art to deliver to the circuit 42' a unidirectional energizing voltage having only a slight alternating current ripple component.

In the operation of the detector circuit of Fig. 6, the occurrence of combustion in the cylinder containing the ionization gap 43 causes a voltage to be developed across the resistance 104 which follows a curve similar to the curve 21 of Fig. 2, but opposite in direction. That is, the increase in ionization accompanying combustion causes a voltage drop across the resistance 104 in such a direcon as to make negative the end of this resistor which is adjacent to the grid 61. The condenser 85 is made to have a sufficiently low capacitance in order that conduction through the resistance 86 will prevent the potential between the grid 61 and its associated cathode 62 from swinging as far negative as the adjacent end of the resistor 104. Similarly, the condenser 85 prevents the potential on the grid 61 from swinging as far positive as it tends to be driven when the ionization current returns to its initial zero value. It is seen, therefore, that the condenser 85 acts to suppress partially the effects of the current surge accompanying combustion.

The signal applied to the grid 61 of the triode 54 resulting from the suppressed current surge of combustion is amplified by the triode 54 and applied to the grid 65 of the triode 55 through the coupling condenser 89. Due to the 180° phase shift occurring in the triode 54, the signal applied to the grid 65 representing increased ionization tends to drive the grid 65 positive similar to the condition described for the grid 9 of the circuit of Fig. 1. However, as explained for the circuit of Fig. 1, the action of grid rectification in the tube 55, together with the coupling condenser 89, whose value is made sufficiently small, prevents the grid 65 from swinging as far positive as the plate 60 of the triode 54 tends to drive it. Also, as for the circuit of Fig. 1, the tendency for the current of decreasing ionization to drive the grid 65 negative is suppressed by the flow of electrons from the condenser 89 through the resistance 91.

The resulting suppressed signal on the grid 65 of the triode 55 is amplified and applied across the input to the oscilloscope 84. The final signal applied to the oscilloscope is, therefore, the suppressed and amplified resultant of the original surge of voltage across the resistance 104 accompanying combustion. This signal will be similar in form to the curve 36 of Fig. 3, for although the combustion voltage surge across the resistance 104 tends to drive the discriminating circuit negative, the phase inversion accomplished by the triode 54 produces a positive surge on the grid 65 of the triode 55 and hence permits grid rectification to accomplish suppression of the surge, giving an output signal of the same phase as that obtained from the circuit of Fig. 1.

Upon the occurrence of detonation, the same action as described above for the signal resulting some combustion takes place, but the relatively high frequency signal which accompanies detonation is not suppressed by the condensers 85 and 89, but is amplified by the triode 54 and applied to the grid 65 of the triode 55. Here for the most part the signal is not further suppressed by grid rectification, but is further amplified so that the resulting signal applied to the oscilloscope 84 shows a considerable difference between the magnitudes of the unsuppressed detonation signal and the suppressed combustion signal. The presence, therefore, of the high frequency signal on the oscilloscope screen is an indication of the occurrence of detonation.

In Fig. 7 is illustrated a particular embodiment of the circuit of Fig. 1 in which the detonation responsive means 12 of Fig. 1 comprises a high-pass R.-C. filter network for further suppressing the effects of the ionization surges previously described and for transmitting the fluctuating signal indicative of detonation, a neon lamp indicator for giving an indication of the occurrence of detonation, and additional stages of amplification for amplifying the detonation signal a sufficient amount to actuate the neon lamp indicator.

The detonation detector whose circuit is shown in Fig. 7 comprises an ionization gap 187, a neon lamp indicator 188, a source of direct voltage, such as a battery 189, three vacuum tubes 190, 191, and 192, and various resistances and condensers to be hereinafter described.

The vacuum tubes 190, 191, and 192 are of the triode type, such as the type 6SF5. The triode 190 comprises a plate 193, a grid 194, a cathode 195, and a heater filament 196. The triode 191 comprises a plate 197, a grid 198, a cathode 199, and a heater filament 200. The triode 192 comprises a plate 201, a grid 202, a cathode 203, and a heater filament 204. The heater filaments 196, 200, and 204, of the tubes 190, 191, and 192, respectively, are connected to and energized by a source of heater energizing voltage, not shown, through the partially shown conductors X and Y.

The gap 187 is formed between a central insulated electrode 205 and the cylinder wall 206 through which the electrode passes. The cylinder wall is grounded through the frame of the engine as shown at 207. The gap electrode 205 is connected through a resistor 208 and a negative bus 209 to the negative terminal of the battery 189. Since the positive terminal of the battery 189 is grounded, the gap 187 is seen to be in a series circuit with the resistance 208 and the battery 189. Changes in the resistance existing across the gap 187 cause a varying current to flow through the resistance 208, producing across that resistance a voltage whose variations correspond to the changes in the gap resistance. The gap electrode 205 is coupled to the grid 194 of the triode 190 by means of a coupling condenser 210. A grid resistance 211 is connected between the grid 194 and the negative bus 209. The cathode 195 is also connected to bus 209.

The plate 193 of the triode 190 is connected to a resistance-capacitance filter network, consisting of resistances 212, 213, and 216, and the condensers 214 and 215. The resistance 212 is connected between the plate 193 and the positive bus 214A, the latter being connected to the positive terminal of the battery 189 and to ground. One side of the condenser 214 is connected to the plate 193, the other side being connected to one end of the resistance 213, the other end of which is connected to the positive bus 214A. One side of a coupling condenser 215 is connected to the junction of the condenser 214 and the resistance 213. The other side of the condenser 215 is connected to the grid 198 of the triode 191. The condenser 215 blocks from the grid 198 the direct current component of the current in the plate circuit of the triode 190, but allows the alternating voltage of the plate circuit to be impressed on the grid 198 across the grid resistance 216, the latter being connected between the grid 198 and the negative bus 209. The triode 191 is provided with cathode bias by a cathode bias resistance 217 connected between the cathode 199 and the bus 209. A cathode bypass condenser 218 is connected in parallel with the resistance 217 to limit the alternating voltage developed across this resistance, and thereby reduce degeneration.

A plate load resistance 219 is connected between the plate 197 of the triode 191 and the positive bus 214A. The alternating voltage developed across this resistance when a signal representative of detonation is being amplified is impressed on the grid 202 of the triode 192 through a coupling condenser 220 and a variable grid resistance 221, the condenser 220 blocking from the grid 202 the direct current of the plate circuit of the triode 191. The variable grid resistance 221 has one end connected to the coupling condenser 220, the other end being connected to the negative bus 209. The slider of the resistance 221 is connected to the grid 202. The triode 192 is supplied with cathode bias by a cathode bias resistance 222 connected between the cathode 203 and the negative bus 209.

The plate 201 of the triode 192 is connected to one electrode of the neon lamp indicator 188 and to one end of a plate load resistance 223.

The other electrode of the neon lamp 188 is connected to the positive bus 214A through a current limiting resistance 224. The other end of the resistance 223 is also connected to the bus 214A.

The portion of the circuit of Fig. 7 ahead of the plate circuit of triode 190 functions in essentially the same manner as the circuit of Fig. 1 whose operation has been previously explained. The plate circuit of the triode 190 includes the R.-C. filter circuit described above, which circuit further attenuates the suppressed low frequency component of the input voltage caused by the successive voltage surges of combustion which is not suppressed completely by grid rectification in the first stage of amplification. When the engine under test is not detonating, the ionization and input voltage curve 21 of Fig. 2 is attenuated in the first stage of amplification and in the filter circuit, and the signal applied to the grid of the triode 192 is not sufficient to cause enough plate current to flow through the resistance 223 to develop a voltage high enough to fire the neon lamp 188. However, upon the occurrence of detonation in the engine, the high frequency component of the input voltage which accompanies the detonation is not attenuated by the first stage of amplification nor by the filter network, but instead this high frequency component is amplified by the three triodes and the resulting signal is impressed on the grid 202 of the triode 192. This signal is sufficient to swing the grid 202 positive every alternate half cycle of the high frequency signal with the result that sufficient plate current flows to cause a voltage to be developed across the resistance 223 which will fire the neon lamp indicator 188. The magnitude of the signal which is impressed on the grid 202 can be controlled by means of the variable grid resistance 221 so that the neon lamp may be made to fire upon the occurrence of any desired degree of detonation in the engine.

Fig. 8 shows a modification of a portion of the detector circuit of Fig. 7 wherein a portion of the R.-C. filter circuit of Fig. 7 is replaced in Fig. 8 by an L.-C. filter circuit. The filter resistances 212 and 213 of Fig. 7 are replaced in Fig. 8 by the inductances 225 and 226 respectively.

In Fig. 9 is seen another modification of a portion of the circuit of Fig. 7. In Fig. 9, the R.-C. filter circuit of Fig. 7 has been replaced by the R.-C. filter circuit shown, which differs from that of Fig. 7 in that the resistance 213 and the condenser 214 are eliminated.

Fig. 10 illustrates a modification of the detonation detector of Fig. 7 in which the tube cathodes are essentially connected to ground, thus avoiding any undesirable effects, such as stray coupling and feed-back, which may result in the operation of the circuit of Fig. 7 by having the cathodes return to a potential other than ground. In the circuit of Fig. 10 the L.-C. filter of Fig. 8 is used, and an energizing circuit is included for permitting operation of the detector from an alternating current source. This circuit consists of a power transformer 227, a duplex diode vacuum tube 228, a filter reactance 229, filter condensers 230, 231, 232, 233, and 234, and filter resistances 235, 236, 237, and 238. The transformer 227 comprises a primary winding 239, a high voltage secondary winding 240, and a heater exciting voltage winding 241. This latter winding is center tapped at the point 242 and the center tap is grounded.

The duplex diode vacuum tube 228 comprises a plate 243, a second plate 244, a cathode 245, and a heater filament 246. The heater filament 246 and the heater filaments of the other tubes in the circuit are connected to and supplied with energizing voltage by the winding 241 of the transformer 227 through conductors X and Y, partially shown.

The components of the circuit of Fig. 10, other than those just described, bear reference numerals which correspond to respective components of Fig. 7.

The plates 243 and 244 of the duplex diode, full wave rectifier tube 228 are connected respectively to the opposite ends of the secondary winding 240 of the transformer 227. The winding 240 is center-tapped at a point 247, which point is connected to a negative bus 248. The cathode 245 of the tube 228 is connected to a point 249 through the filter reactance 229. This reactance is center-tapped at a point 250, which point is connected to the negative bus 248 through the filter condenser 232.

The point 249 has connected to it the supply ends of the resistances 223 and 224 of the plate circuit of the last stage of amplification, thereby supplying this stage with plate voltage. To the point 249 is also connected one end of the filter resistance 236. The other end of resistance 236 is connected to one end of the filter resistance 235. The other end of resistance 235 is connected to the supply ends of the inductances 225 and 226 in the plate circuit of the first stage of amplification, providing this stage with plate voltage. The supply end of the plate resistance 219 of the second stage of amplification is connected to the junction of the resistances 235 and 236, thereby providing this stage with plate voltage. The filter resistance 237 is connected between the point 249 and ground. The condenser 233 is connected between the point 249 and the negative bus 248. The condenser 234 is connected between the bus 248 and ground, as is the resistance 238. The condenser 231 is connected between the junction of the resistances 235 and 236 and ground, and the condenser 230 is connected between the first stage end of the resistance 235 and ground. The primary winding 239 of the transformer 227 is supplied with exciting voltage from an alternating current source, not shown, through the supply conductors 251 and 252.

The circuit of Fig. 10 is seen to differ from that of Fig. 7 in that the former does not have the positive voltage bus grounded as is the case with the circuit of Fig. 7. In Fig. 10, the grounding arrangement employed is that ordinarily utilized in the electronic art. Specifically, the gap 187 is supplied with negative voltage as in Fig. 7, this being obtained in the circuit of Fig. 10 by the flow of the total plate current of the circuit through the resistance 238. The rectifier tube 228, the transformer 227, the filter reactance 229, and the various filter condensers and resistors serve to provide a source of filtered, direct voltage to the plate circuits and the input circuit of the detector.

As in the circuit of Fig. 7, the use of a negative potential with respect to ground across the ionization gap causes a positive input voltage surge to result from combustion, enabling grid rectification in the first stage to suppress the effects of this surge.

In Fig. 11 is shown a modification of a portion of the circuit of Fig. 10. In the circuit of Fig. 11, an L.-C. filter network has been included in the input circuit to the first stage of amplification. This filter network comprises two inductances 253 and 254 and a condenser 255. The amplifier side of the input coupling condenser 210 is connected to one side of the filter condenser 255, the other side of the latter being connected to the grid 194. The inductance 253 is connected between the junction of the condensers 210 and 255 and ground. The inductance 254 is connected between the grid 194 and ground.

In Fig. 12 is shown another modification of the detector of Fig. 10, which modification consists of the addition of a second output and indicating stage of amplification. This stage consists of a triode 256, having a plate 257, a grid 258, a cathode 259, and a heater filament 260; a second neon lamp indicator 261; a plate load resistance 262; a current limiting resistance 263; a cathode bias resistance 264; and a variable grid resistance 265.

The variable resistance 265 is inserted between the resistance 221 and ground. The slider of the resistance 265 is connected to the grid 258 of the second indicator amplifier tube 256. The neon lamp 261 and the resistance 263 are connected in series between the plate 257 and the positive plate voltage bus. The resistance 262 is also connected between this bus and the plate 257. The cathode 259 is connected to ground through the cathode bias resistance 264.

By adjusting the sliders on the resistances 221 and 265, the magnitude of the signal which is fed to each of the indicator stages is controlled. Thus the slider on the resistance 221 may be so adjusted that a slight intensity of detonation causes the first neon lamp indicator 188 to flash, while the slider on the resistance 265 is adjusted so as to prevent the second neon lamp 261 from flashing for this condition, but to permit it to flash upon the occurrence of more intense detonation. If desired, the indicating glow lamp 188 may contain a different gas from that of the lamp 261 to provide indications having different colors corresponding to the different degrees of ionization occurring. Also, relays or other detectors may be used in place of the glow lamp indicators, if desired.

In Fig. 13 is shown a method of and a circuit for connecting a plurality of ionization gaps in separate cylinders of a multi-cylinder engine to the detector circuit of Fig. 10. A cable 266, insulated from ground, is connected from the junction of the input coupling condenser 210 and the gap voltage resistance 208 to the electrodes 205 of the ionization gaps 187. The cylinder walls 206, forming the other electrodes for the gaps 187, are grounded by the engine frame as at the ground points 207. Thus, the plurality of gaps 187 are connected in parallel in the input circuit of the detonation detector circuit. With this arrangement, it is thus possible to detect the occurrence of detonation in any of the cylinders of a multi-cylinder engine. It is noted that the presence of a number of other ionization gaps connected in parallel with the gap which is in action at any given time does not affect the performance of the working gap, since all gaps except the acting one have practically infinite resistance between their electrodes.

In Fig. 14 is shown a diagram illustrating an embodiment of the present invention in which the detonation detector actuates a controller in such a manner as to regulate the fuel to air ratio of the combustible mixture supplied to the cylinders of a spark ignited internal combustion engine. The system for obtaining automatic mixture control may comprise a detonation detector 267, of the type as described hereinbefore, to which is connected a plurality of ionization gaps 268 by an insulated cable 269. If desired, there may be an ionization gap for each of the cylinders of the engine which is to be controlled by the present device. The detector 267 may be used to initiate the actions of a control unit 270, which control unit operates through a suitable connecting means 271 to adjust the carburetor, not shown, of the engine controlled. A cable 270' supplies the system with operating voltage from a suitable source, not shown.

To this end, the controller 270 may desirably comprise a pair of relays 342 and 343, respectively, and a reversible electric motor 344 as shown in Fig. 15. By way of example, the motor 344 may be a condenser-type, split phase, reversible induction motor. The coils of the relays are shown in Fig. 15 connected in the detector output circuit of Fig. 12 in such a manner as to cause the required operation of the reversible motor 344 needed to maintain a fuel-to-air ratio of such proportions that serious detonation is avoided.

The reversible motor 344 is arranged in any suitable way, as by the connecting means 271, to adjust mechanically the carburetor of the engine to be controlled in such a manner that rotation of the motor 344 in one direction causes an increase in the fuel-to-air ratio of the combustible mixture supplied to the engine by the carburetor, and rotation in the opposite direction causes a decrease in the fuel-to-air ratio.

The coil 345 of the relay 342 is connected in place of the load resistance 223 of Fig. 12, in parallel with the series combination of the resistance 224 and the neon glow lamp 188. The relay 342 has a pair of normally open contacts 346 and 347 which are connected in series with a conductor 348 and one of the field windings 349 of the motor 344. The coil 350 of the relay 343 is connected in place of the load resistance 262, in parallel with the series combination of the neon glow lamp 261 and the resistance 263 of Fig. 12. This second relay 343 has a pair of normally closed contacts 351 and 352 which are connected in series with the conductor 348 and the other field winding 353 of the motor 344. The opposite ends of the field windings 349 and 353 respectively are connected to a conductor 354, which conductor together with the conductor 348 is connected to a source of alternating current potential, not shown. A condenser 355 is connected between the ends of the field windings 349 and 353 which connect to the relay contacts 346 and 352, respectively. The rotor 356 of the motor 344 is connected to the carburetor of the engine by the connecting means 271.

When the engine under test is operating normally, that is, with only a slight tendency to detonate, the first mentioned relay 342 will be energized by virtue of the fact that the triode 192 will be conductive as previously explained in connection with the circuit of Fig. 12. Under this condition, the triode 256 will be non-conductive and the second relay 343 will not be energized. Therefore, current will flow from the source through the conductor 348, through the contacts 346 and 347, the contacts 351 and 352, and through the two field windings 349 and 353 of the motor 344. This will cause the rotor 356 to be locked in position, and hence prevented from effecting any change in the fuel-to-air ratio, since the currents flowing in both of the field windings will be of the same phase.

If the slight tendency of the engine to detonate disappears, the triode 192 will become non-conductive, which will cause the first relay 342 to be deenergized and to open its contacts 346 and 347. As a result, the current will continue to flow through the field winding 353 of the motor 344, in phase with the current of the energizing source, and a current will be caused to flow through the field winding 349 which is 90° out of phase with the current in the winding 353, due to the action of the condenser 355. When this occurs, the rotor 356 of the motor 344 will rotate in such a direction as to adjust the carburetor to cause the fuel-to-air ratio to be decreased. Upon this decrease in the fuel-to-air ratio, the condition of operation with slight detonation will be resumed and the rotor 356 will again be prevented from turning.

If excessive detonation occurs, the triode 256 will be made conductive, the second relay 343 will be energized, and its contacts 351 and 352 will open. This will cause a current to flow through the winding 353 of the motor 344 which is 90° out of phase with the current in the winding 349. Under this condition, the rotor 356 will rotate in such a direction as to increase the fuel-to-air ratio. When this takes place, the intensity of detonation will be reduced to the desired small value, the rotor 356 will be prevented from further rotation, and the desired operating condition of the engine will be restored.

The controller 270 is operable, therefore, to adjust the carburetor to deliver to the cylinders of the engine a mixture which is as lean as possible, without more than a slight intensity of detonation occurring, the action of the controller 270 being governed by the detonation detector 261. An indicator 272 is used to indicate the degree of the detonation occurring, such an indicator comprising the neon glow lamps 188 and 261 and being of assistance when adjusting the system to permit a desired allowable degree of detonation to occur. The variable resistances 221 and 265 can be adjusted so that operation with any desired intensity of slight detonation will be maintained.

In Fig. 16 is shown the circuit of a particular embodiment of the present invention in which the steeply rising portion of the combustion ionization voltage curve is suppressed by the action of a time delay circuit. The circuit of Fig. 16 comprises a time delay discriminating portion 273, an amplifying and indicating portion 274, and a direct voltage supply portion 275. The time delay circuit 273 consists of a vacuum tube 276 and various other circuit components, as shown, to be hereinafter named and described. The tube 276 is of the twin triode type, such as the type 7F7, consisting of two sets of triode elements 277 and 278, respectively, contained in a single envelope. The triode 277 comprises a plate 279, a control grid 280, and a cathode 281. The triode 278 comprises a plate 282, a control grid 283, and a cathode 284. A heater filament 285 heats the cathodes 281 and 284.

The amplifier and output circuit 274 consists of a vacuum tube 286, a neon glow lamp 287, and various other circuit components, as shown, to be hereinafter described. The tube 286 is of the twin triode type, such as the type 7F7, consisting of two sets of triode elements 288 and 289, respectively, contained in a single envelope. The triode 288 comprises a plate 290, a control grid 291, and a cathode 292. The triode 289 comprises a plate 293, a control grid 294, and a cathode 295. A heater filament 296 heats the cathodes 292 and 295.

The direct voltage supply circuit 275 comprises a power transformer 297, a vacuum tube 298, and various other circuit components, as shown, to be hereinafter described. The transformer 297 has a primary winding 299 which is supplied with alternating energizing voltage from a suitable source, not shown, by the conductors 300 and 301. The transformer 297 also has a high voltage secondary winding 302, which is center-tapped at the point 303, and a low voltage heater winding 304 which is center-tapped at the point 305. The tube 298 is of the full wave rectifier type, such as the type 6X5, comprising a first plate 306, a second plate 307, a cathode 308 common to both plates, and a heater filament 309. The heater filaments 285, 296, and 309 are connected by the conductors X and Y, partially shown, to the heater winding 304 of the transformer 297, from which winding the heaters receive their energizing voltage. The center tap 305 of the heater winding 304 is connected to ground by a ground bus 310.

The plates 306 and 307 of the rectifier tube 298 are respectively connected to the opposite ends of the secondary winding 302. The center tap 303 of the winding 302 is grounded through the bus 310.

The cathode 308 of the rectifier tube 298 is connected to a positive conductor 311 through a filter reactance 312. A filter condenser 313 is connected between the cathode 308 and ground, and a filter condenser 314 is connected between the conductor 311 and ground. The transformer 297, the rectifier 298, the filter reactance 312, and the filter condensers 313 and 314 operate together in the usual manner to supply between the positive conductor 311 and the ground bus 310 a practically ripple-free direct potential.

An ionization gap 315 located in a cylinder of an internal combustion engine is formed between an insulated electrode 316 and the interior surface 317 of the cylinder wall through which the electrode passes. This wall, forming the other electrode for the ionization gap, is grounded through the frame of the engine.

The electrode 316 of the gap 315 is connected to the positive conductor 311 through a series circuit comprising resistances 318, 319, and 320. The resistance 318 has one end connected to the electrode 316, its other end being connected through the resistance 319 to one end of the resistance 320. The other end of the latter is connected to the conductor 311.

The electrode 316 is also connected to the grid 280 of triode 277 through a condenser 321 and a resistance 322, connected in series. Triode 277 is employed to supply grid bias to the triode 278. To this end, the cathode 281 of the triode 277 is connected to the cathode 284 of the triode 278, and both cathodes are connected to the grid 280 through a resistance 323 and the resistance 322, connected in series. A condenser 324 is connected between the cathodes 281 and 284 and ground. A variable resistance 325 is connected in parallel with the condenser 324, the slider of the resistance 325 being connected to the grid 283 of the triode 278 through a resistance 326. The grid 283 is also connected to the electrode 316 through a small-value coupling condenser 327.

The plate 279 of the triode 277 is connected to the junction between the resistances 318 and 319. To this junction is also connected one end of a plate load resistance 328 whose other end is connected to the plate 282 of the triode 278. A condenser 329 is connected between the above junction and ground. The plate 282 is connected through a coupling condenser 330 to one end of a variable grid resistance 331, whose slider is connected to the grid 291 of the amplifier triode 288. The other end of the resistance 331 is connected to ground through the bus 310.

The cathode 292 of the triode 288 is connected to ground through a cathode bias resistance 332 and a condenser 333, connected in parallel with each other. The plate 290 of this triode is connected through a plate load resistance 334 to the junction between the resistances 319 and 320. To this junction is also connected one side of a condenser 335, whose other side is grounded through the bus 310.

The plate 290 is connected to the grid 294 of the triode 289 through a coupling condenser 336, this grid being connected to the ground bus 310 through a grid resistance 337. The cathode 295 of the triode 289 is connected to ground through a cathode bias resistance 338 and a condenser 339, connected in parallel with each other.

The plate 293 of the triode 289 is connected to the conductor 311 through a series-parallel circuit consisting of two parallel branches. The first branch contains a plate load resistance 340, and the second branch contains a current limiting resistance 341 and the neon glow lamp 287 connected in series.

In the operation of the detonation detector circuit of Fig. 16, there is practically an infinite resistance between the electrodes 316 and 317 of the ionization gap 315 when there are no burning gases in the cylinder containing the gap. Under this condition the condenser 321 is charged, and there is little or no current flow through the resistances 322, and 323, hence the grid 280 of the triode 277 is at the same potential as its cathode 281. The triode 277 is therefore conductive, and a current flows in the plate-cathode circuit of this tube, passing through the cathode resistance 325 and developing across the latter a potential difference. This potential difference charges the condenser 324, and also maintains the grid 283 of the triode 278 negative with respect to its cathode 284 and thereby biases the triode 278 to cut-off, the amount of negative bias voltage applied to the grid being dependent on the position of the slider on the resistance 325. With the triode 278 biased to cut-off, no plate current flows, the discriminator circuit 273 is rendered insensitive and no signal is applied to the grid 291 of the amplifying triode 288. The constants of the amplifying and indicating circuit 274 are so adjusted that with no signal on the grid 291, the triode 289 does not conduct sufficient plate current to cause the neon glow lamp 287 to fire.

Upon firing of the sparkplug in the engine cylinder under test, the gases ignite and burn, and as a result the ionization of these gases rapidly increases. This causes a corresponding rapid decrease in the resistance between the electrodes of the gap 315, which results in the flow of a surge of current through the resistance 318. This current surge produces across the latter resistance a potential surge which rapidly lowers the potential of the electrode 316 with respect to ground in a manner similar to that shown by the curve 21 of Fig. 2, but opposite in direction. As a result, the grid 280 of the triode 277 is driven negative by the negative swing of the electrode 316, and the plate current of the triode 277 is thereby cut off. The negative swing of the electrode 316 also causes the grid 283 of the triode 278 to be driven negative, but since the grid 283 is already at a negative potential with respect to its cathode 284, and the triode 278 is therefore non-conductive, this negative swing of the grid produces no effect on the triode 278. As soon as the triode 277 ceases to conduct current, however, the condenser 324 starts to discharge through the resistance 325, and the negative potential difference between the grid 283 and the cathode 284 of the triode 278 decreases. The time constant of the R.-C. circuit comprising the condenser 327 and the resistance 326, and the time constant of the R.-C. circuit comprising the condenser 324 and the resistance 325, are made appropriately small in order that the grid 283 will be unblocked, and the triode 278 will thereby be made conductive, at a time slightly after the ionization of combustion and hence the negative swing of the electrode 316 have reached their maximum values.

As the ionization decreases from this maximum value, the electrode 316 swings in a positive direction, tending to swing positive the grids 280 and 283. The grid 280 is prevented from following the positive swing of the electrode 316 by grid rectification as explained for the circuit of Fig. 1, whereas the grid 283 is prevented from swinging positive by the differentiating action of the condenser 327, whose capacity is made appropriately small to accomplish this.

During the positive swing of the electrode 316 for decreasing ionization, the triode 277 remains non-conductive, since the time constant of the R.-C. circuit comprising the condenser 321 and the resistance 323 is made appropriately large in order that the grid 280 will be maintained sufficiently negative so that the triode 278 will be conductive until the ionization has decreased to approximately its initial value. By the time that this occurs, the grid 280 has lost its negative charge and once more allows conduction in the triode 277, thereby causing plate current to flow again in this triode, driving the triode 278 to cut-off and rendering the circuit insensitive just prior to the occurrence of the next ionization surge. It is seen, therefore, that the surges of ionization caused by combustion do not develop on the grid 283 of the triode 278 any signal which will be amplified to cause firing of the neon glow lamp 287.

When detonation occurs, it does so at a time when the ionization of combustion is decreasing. As was previously shown, the triode 278 becomes conductive at this time, hence the high frequency detonation signal which occurs will be impressed on the grid 283 of this triode and amplifier. The time constant of the input circuit to the triode 278 is such that the detonation signal will cause the grid 283 to swing with it. This signal, amplified by the triode 278, will be further amplified by the triodes 288 and 289, and will cause the triode 289 to conduct sufficient plate current to fire the neon glow lamp 287. In this manner, the neon lamp is caused to flash an indication of the occurrence of detonation. By adjusting the slider on the resistance 331, the magnitude of the detonation signal fed to the triodes 288 and 289 can be controlled, thereby controlling the intensity of detonation at or above which the neon lamp will flash an indication.

Subject matter disclosed but not claimed herein is disclosed and claimed in the copending application of Herbert A. Clarke, Serial No. 661,201, which was filed on April 11, 1946, and which issued as Patent No. 2,517,976 on August 8, 1950.

While, in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. The method of detecting certain groups of fluctuations in ionization occurring during surges of ionization in a chamber containing successive quantities of gases exhibiting surges of ionization, comprising the steps of passing an electrical current across a gap in said chamber adapted to be bridged by the ionized gases, suppressing the effects of the surges of said electrical current produced by said surges of ionization, and detecting the occurrence of fluctuations in said electrical current which are caused by said certain groups of ionization fluctuations.

2. The method of detecting detonation in a cylinder of an internal combustion engine comprising the steps of passing an electrical current across a gap in said cylinder adapted to be bridged by the burning gases of combustion, suppressing the effect of the initial surge of said electrical current which occurs upon ignition of the gases, and detecting the occurence of fluctuations in said current which follow said initial surge and which result from fluctuations in the ionization of the gases of combustion accompanying detonation.

3. Apparatus comprising a pair of spaced, electrically insulated electrodes adapted to be bridged by ionized gases in a chamber containing successive quantities of gases, means for producing an electrical current flow between said electrodes, and means connected to said electrodes for suppressing the effects of surges of said current resulting from surges of ionization of said gases, and for detecting the occurrence of fluctuations in said electrical current which are caused by fluctuations in the ionization of said gases following said ionization surges.

4. Apparatus for detecting detonation in a cylinder of an internal combustion engine, comprising a pair of spaced, electrically insulated electrodes adapted to be located in said cylinder and adapted, when so located, to be bridged by the burning gases of combustion, means for passing an electrical current between said electrodes, means for suppressing the effects of the initial surge of said electrical current which occurs upon ignition of said gases, means sensitive to certain rates of fluctuations of said current corresponding to fluctuations in ionization of said burning gases accompanying detonation, and means for indicating the occurrence of said certain rates of fluctuation of said current accompanying detonation.

5. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a source of energizing voltage, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including discriminating means for suppressing the effects of the initial surge of said electrical current which occurs upon ignition of said gases and for detecting the occurrence of certain rates of fluctuation of said current which accompany detonation, and indicating means connected in the output circuit of said electronic amplifying means, said indicating means being adapted to indicate the occurrence of said certain rates of fluctuation of said current accompanying detonation.

6. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a source of energizing voltage, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including a discriminating means operative to control the gain of said electronic amplifying means for suppressing the effects of the initial surge of said electrical current which occurs upon ignition of said gases, and indicating means connected in the output circuit of said electronic amplifying means and sensitive to certain rates of fluctuation of said current corresponding to fluctuations in ionization of said burning gases accompanying detonation, said indicating means being adapted to indicate the occurrence of said certain rates of fluctuation of said current accompanying detonation.

7. Apparatus for detecting detonation in a cylinder of an internal combustion engine, comprising a pair of spaced, electrically insulated electrodes adapted to be located in said cylinder and adapted, when so located, to be bridged by the burning gases of combustion, an energizing circuit adapted to be connected to an alternating current source of potential, said energizing circuit including means for passing a unidirectional electrical current between said electrodes, electronic amplifying means having an input circuit including said electrodes and an output circuit supplied with energizing voltage by said energizing circuit, said electronic amplifying means comprising at least one stage of amplification and including a discriminating means operative to control the gain of said electronic amplifying means for suppressing the effects of the initial surge of said electrical current which occurs upon ignition of said gases, and indicating means connected in the output circuit of said electronic amplifying means, said indicating means being sensitive to certain rates of fluctuation of said current corresponding to fluctuations in ionization of said burning gases accompanying detonation and adapted to indicate the occurrence of said certain rates of fluctuation of said current accompanying detonation.

8. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a direct current source of potential, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including a discriminating means operative to control the gain of said electronic amplifying means for suppressing the effects of the initial surge of said electrical current which occurs upon ignition of said gases, and indicating means connected in the output circuit of said electronic amplifying means, said indicating means being sensitive to certain rates of fluctuation of said current corresponding to fluctuations in ionization of said burning gases accompanying detonation and adapted to indicate the occurrence of said certain rates of fluctuation of said current accompanying detonation.

9. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a source of energizing voltage, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including a first discriminating means for suppressing the effects of the initial surge of said electrical current which occurs upon ignition of said gases and a second discriminating means sensitive to certain rates of fluctuation of said current corresponding to fluctuations in ionization of said burning gases accompanying detonation but insensitive to other rates of fluctuation of said current corresponding to other fluctuations in ionization of said burning gases accompanying normal combustion, and indicating means connected in the output circuit of said electronic amplifying means to indicate the occurrence of said certain rates of fluctuation of said current accompanying detonation.

10. Apparatus for detecting detonation in a cylinder of an internal combustion engine, comprising a pair of spaced, electrically insulated electrodes adapted to be located in said cylinder and adapted, when so located, to be bridged by the burning gases of combustion, an energizing circuit adapted to be connected to an alternating current source of potential, said energizing circuit including means for passing a unidirectional electrical current between said electrodes, electronic amplifying means having an input circuit including said electrodes and an output circuit supplied with energizing voltage by said energizing circuit, said electronic amplifying means comprising at least one stage of amplification and including a first discriminating means for suppressing the effects of the initial surge of said electrical current which occurs upon ignition of said gases and a second discriminating means sensitive to certain rates of fluctuation of said current corresponding to fluctuations in ionization of said burning gases accompanying detonation but insensitive to other rates of fluctuation of said burning gases accompanying normal combustion, and indicating means connected in the output circuit of said electronic amplifying means to indicate the occurrence of said certain rates of fluctuation of said current accompanying detonation.

11. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a direct current source of potential, including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including a first discriminating means for suppressing the effects of the initial surge of said electrical current which occurs upon ignition of said gases and a second discriminating means sensitive to certain rates of fluctuation of said current corresponding to fluctuations in ionization of said burning gases accompanying detonation but insensitive to certain other rates of fluctuation of said current corresponding to other fluctuations in ionization of said burning gases accompanying normal combustion, and indicating means connected in the output circuit of said electronic amplifying means to indicate the occurrence of said certain rates of fluctuation of said current accompanying detonation.

12. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a source of energizing voltage, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including a discriminating means for suppressing the effects of the initial surge of said electrical current which occurs upon ignition of said gases, said discriminating means comprising resistive and capacitive means for causing one or more of the stages of amplification of said electronic amplifying means to provide grid rectification for accomplishing suppression of the effects of said initial surge of current, and indicating means connected in the output circuit of said electronic amplifying means, said indicating means being sensitive to certain rates of fluctuation of said current corresponding to fluctuations in ionization of said burning gases accompanying detonation and adapted to indicate the occurrence of said certain rates of fluctuation of said current accompanying detonation.

13. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a source of energizing voltage, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including a first discriminating means for suppressing the effects of the initial surge of said electrical current which occurs upon ignition of said gases, said first discriminating means comprising an electron tube with resistive and capacitive means providing grid rectification for accomplishing suppression of the effects of said initial surge of current, and a second discriminating means sensitive to certain rates of fluctuation of said current corresponding to fluctuations in ionization of said burning gases accompanying detonation but insensitive to other rates of fluctuation of said current corresponding to other fluctuations in ionization of said burning gases accompanying normal combustion, said second discriminating means comprising at least one resistance-capacitance, high-pass filter network, and indicating means connected in the output circuit of said electronic amplifying means to indicate the occurrence of said certain rates of fluctuation of said current accompanying detonation.

14. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a source of energizing voltage, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including a first discriminating means for suppressing the effects of the initial surge of said electrical current which occurs upon ignition of said gases, said first discriminating means comprising an electron tube with resistive and capacitive means providing grid rectification for accomplishing suppression of the effects of said initial surge of current, and a second discriminating means sensitive to certain rates of fluctuation of said current corresponding to fluctuations in ionization of said burning gases accompanying detonation but insensitive to other rates of fluctuation of said current corresponding to other fluctuations in ionization of said burning gases accompanying normal combustion, said second discriminating means comprising at least one inductance-capacitance, high-pass filter network, and indicating means connected in the output circuit of said electronic amplifying means to indicate the occurrence of said certain rates of fluctuation of said current accompanying detonation.

15. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a source of energizing voltage, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including a first discriminating means for suppressing the effects of the initial surge of said electrical current which occurs upon ignition of said gases, said first discriminating means operating to render said electronic amplifying means insensitive for the duration of said initial surge of current, and a second discriminating means sensitive to certain rates of fluctuation of said current corresponding to fluctuations in ionization of said burning gases accompanying detonation but insensitive to other rates of fluctuation of said current corresponding to other fluctuations in ionization of said burning gases accompanying normal combustion, said second discriminating means comprising at least one resistance-capacitance, high-pass filter network, and indicating means connected in the output circuit of said electronic amplifying means to indicate the occurrence of said certain rates of fluctuation of said current accompanying detonation.

16. Apparatus for detecting detonation in a cylinder of an internal combustion engine, comprising a pair of spaced, electrically insulated electrodes adapted to be located in said cylinder and adapted, when so located, to be bridged by the burning gases of combustion, means adapted to be connected to a source of energizing voltage, said means including means for passing a unidirectional electrical current between said electrodes, electronic amplifying means having an input circuit including said electrodes and an output circuit supplied with energizing voltage by said first mentioned means, said electronic amplifying means comprising at least one stage of amplification and including discriminating means for suppressing the effects of the initial surge of said electrical current which occurs upon ignition of said gases and for detecting the occurrence of certain rates of fluctuation of said current which accompany detonation, and indicating means connected in the output circuit of said electronic amplifying means, said indicating means being adapted to indicate the occurrence of said certain rates of fluctuation of said current accompanying detonation and comprising a plurality of indicators, each of said indicators being adapted to indicate the occurrence of a respective intensity of detonation.

17. Apparatus for detecting detonation in at least two cylinders of an internal combustion engine, comprising a pair of spaced, electrically insulated electrodes associated with each of said cylinders in which detonation is to be detected, said electrodes being adapted to be bridged by the burning gases of combustion, means for passing an electrical current between each pair of electrodes, means for suppressing the effects of the initial surge of said electrical current which occurs upon ignition of said gases, means sensitive to certain rates of fluctuation of said current corresponding to fluctuations in ionization of said burning gases accompanying detonation, and means for indicating the occurrence of said certain rates of fluctuation of said current accompanying detonation.

18. Frequency discriminating apparatus for detecting the presence of certain relatively high frequency fluctuations of a varying electrical current which are superimposed on other relatively low frequency fluctuations of said electrical current, comprising electronic amplifying means having an input circuit through which said electrical current flows and having an output circuit, said electronic amplifying means comprising at least one stage of amplification and including means to suppress the effects of the increasing portions of the relatively low frequency fluctuations of said electrical current and to detect the presence of the relatively high frequency fluctuations of said electrical current only during the decreasing portions of the relatively low frequency fluctuations of said electrical current, and indicating means connected in the output circuit of said electronic amplifying means to indicate the detection of the relatively high frequency fluctuations of said electrical current.

THOMAS R. HARRISON.

REFERENCES CITED

The following references are of record in the file of this patent:

UNITED STATES PATENTS

| Number | Name | Date |
|---|---|---|
| 1,592,364 | Housekeeper | July 13, 1926 |
| 1,808,709 | Blake | June 2, 1931 |
| 2,220,558 | Van Dijck et al. | Nov. 5, 1940 |
| 2,249,573 | Morse | July 15, 1941 |
| 2,275,675 | Draper | Mar. 10, 1942 |
| 2,340,714 | Traver | Feb. 1, 1944 |
| 2,395,902 | Niesewanger et al. | Mar. 5, 1946 |
| 2,401,563 | Hersey | June 4, 1946 |
| 2,407,652 | Costa | Sept. 17, 1946 |
| 2,416,614 | Crossley | Feb. 25, 1947 |
| 2,450,882 | Costa | Oct. 12, 1948 |

FOREIGN PATENTS

| Number | Country | Date |
|---|---|---|
| 502,661 | Great Britain | Mar. 22, 1939 |